United States Patent [19]

Daily

[11] Patent Number: 5,361,127
[45] Date of Patent: Nov. 1, 1994

[54] MULTI-IMAGE SINGLE SENSOR DEPTH RECOVERY SYSTEM

[75] Inventor: Michael J. Daily, Thousand Oaks, Calif.

[73] Assignee: Hughes Aircraft Company, Los Angeles, Calif.

[21] Appl. No.: 926,801

[22] Filed: Aug. 7, 1992

[51] Int. Cl.$^5$ ............... G01C 3/00; G01B 11/24
[52] U.S. Cl. ............... 356/1; 348/139; 356/2; 356/376
[58] Field of Search ............ 356/1, 12, 4, 2, 376; 358/3, 96, 107; 348/139

[56] References Cited

U.S. PATENT DOCUMENTS

| | | | |
|---|---|---|---|
| 3,895,870 | 7/1975 | Cullen et al. | 356/1 |
| 4,009,960 | 3/1977 | Feldman et al. | 356/1 |
| 4,110,042 | 8/1978 | Leitz | 356/4 |
| 4,195,425 | 4/1980 | Leitz et al. | 356/28 |
| 4,664,512 | 5/1987 | Shimizu | 356/1 |
| 4,839,824 | 6/1989 | Ando | 358/107 |
| 4,967,226 | 10/1990 | Kuwata | 354/406 |
| 5,137,350 | 8/1992 | Misawa et al. | 356/1 |

OTHER PUBLICATIONS

1992 IEEE Transactions on Pattern Analysis and Machine Intelligence, vol. 14, No. 2, Feb. 1992, "Single Lens Stereo with a Plenoptic Camera", E. Adelson et al. pp. 99–106.

Darpa, Jan. 1992, Proceedings: Image Understanding Workshop, "A Multiple-Baseline Stereo Method", T. Kanade et al., pp. 409–426.

*Primary Examiner*—Stephen C. Buczinski
*Attorney, Agent, or Firm*—Vijayalakshmi D. Duraiswamy; Wanda K. Denson-Low

[57] ABSTRACT

A multi-image single passive sensor depth recovery system is disclosed to determine the depth of an object in a scene, and includes a passive imaging sensor which images radiation from an object at a sensor plane. A lens having a multiplicity of facets located on its surface nearest the object is placed in optical communication with the sensor so that each facet directs radiation from the object to sensor plane to form a corresponding image of the object thereon. The size and shape of each of the facets are selected to position each image on the sensor plane at a predetermined position thereon.

18 Claims, 2 Drawing Sheets

MULTI-IMAGE SINGLE SENSOR DEPTH RECOVERY SYSTEM

BACKGROUND OF THE INVENTION

1. Field of the Invention

This invention relates in general to an apparatus and a method to determine the depth of an object in a scene, and, more particularly, to a multi-image, single sensor depth recovery system.

2. Description of the Related Art

Previously, many depth recovery systems attempted to extract depth from a scene by mimicking the human binocular stereo depth perception system to produce two or more images, each image being viewed from a different environmental, i.e., spatially separated, point. In order for these depth recovery systems to operate properly, two separate but interconnected aspects must be considered and implemented. These aspects are the available hardware and software components that are to be used in constructing the depth recovery system.

On the hardware side, many of these systems require the use of multiple sensors, such as CCD cameras, and typically employ one sensor per desired image. Other systems replace the multiple sensor array with a single sensor that is moved with respect to the scene in a precisely known manner with sequential data being taken and associated with the different environmental points of the known sensor movement.

Both the multiple sensor array and single moving sensor systems attempt to simulate the apparently simple human binocular system, but each results in incredible hardware and computational complexity as their implementation is actually attempted.

Among the common problems of such multiple or moving sensor systems is the difficulty in maintaining real-time computational calibration of each of the sensors forming the system. This is an especially critical problem since depth analysis processing of the system data often requires precise sensor location and known movement to provide useful data. When possibly chaotic and unsteady movement of the sensor platform is considered, the time required for depth analysis processing of the data stream from the sensors increases to the point of rendering real-time analysis of a scene extremely difficult if not practically impossible. Likewise, the possibly chaotic and unsteady movement of the sensor platform often results in high correlation errors in its depth analysis with that of the physical scene.

Likewise, on the software or computational algorithm implementation side, numerous methods for computation of depth from multiple images derived from multiple sensors have been developed over the last 20 or so years.

Typically, as a necessary step in extracting depth from a scene, these depth analysis computational algorithms assume some sort of constraint on the possible locations for matching points or features between multiple images viewed from different environmental points. In the simplest case, two images are used (see FIG. 1), which enables accurate depth recovery in many cases, but forces difficult problems in finding corresponding points between images, aligning sensors, calibrating algorithms, and digitizing images. For repetitive and highly textured surfaces, depth recovery from two stereo images obtained from two cameras becomes completely ambiguous. Multiple camera methods can simplify the problem of finding corresponding image points and eliminate any ambiguity from repetitive textures, but at the expense of increasing the quantity of data to process (and potentially the computer processing time) while simultaneously increasing difficulty in the calibration of the multiple sensors.

A primary barrier to the use of a multi-image lens in conjunction with a single imaging sensor, is the small baseline separation between image centers, normally a few millimeters. With such a small baseline separation, poor accuracy of depth measurements is likely. Consequently, some previous attempts have used large, cumbersome mirror systems to reflect two images of a scene to the same sensor. These systems are prone to error in calibration, and are both large and difficult to move rendering them useless for moving sensor platforms such as on vehicles.

Recent multi-image stereo algorithms, however, have been developed with the capability to use very small baseline separations of the order of a few millimeters and still obtain accurate depth to near objects. These systems use multi-camera arrangements or accurate camera positioning to achieve sufficient sensor, and hence baseline, separation of the images for processing purposes.

A traditional two sensor stereo system using cameras as sensors is shown in FIG. 1. In FIG. 1 two cameras 10 and 12 are positioned in a known spatial relationship to one another and accurately held in this spatial relationship to maintain integrity of the data stream during processing to determine depth of object 14 in the scene being viewed by the cameras.

Typically in this structure, the optical axes 16 and 18 of the two cameras 10 and 12 respectively, are accurately aligned to be both parallel and vertical to one another. The translational separation between the aligned optical axes of the two cameras is called the baseline.

The light rays 22 and 24 from the surface of object 14 are respectively directed by imaging arrays 26 and 28 to cameras 10 and 12 where each camera forms a data stream corresponding to the view of object 14 as would be seen by an observer located at the environmental point occupied by each respective camera.

Once the cameras are aligned, the difference in position of the same environmental point between the two images (known as disparity or parallax), together with the known geometry of the two camera system, can be used to compute the depth to the environmental point using known geometric principles.

This approach, however, requires not only an accurate initial and maintained alignment of the sensors, but further suffers from the fact that it is extremely difficult to search the produced sensor data stream to find corresponding points in the two environmentally displaced images.

A three or more sensor system using cameras is shown in FIG. 2 where elements similar to those described above for FIG. 1 are indicated by a prime appearing on a similar reference numeral.

In FIG. 2, multiple cameras 10' are positioned in a known spatial relationship to one another and accurately held in this spatial relationship to maintain integrity of the data stream during processing to determine depth of the object 14' in the scene being viewed by the cameras.

Typically in this structure, the optical axes 16' of each of the cameras 10' are accurately aligned to be both parallel and vertical to one another. The translational separation between the aligned optical axes of the cameras is called the baseline.

The light rays 22' the surface of object 14' are respectively directed by imaging arrays 26' to each of the cameras 10' so that each camera 10' forms a data stream corresponding to the view of object 14' as would be seen by an observer located at the environmental point occupied by each respective camera 10'.

Once the cameras are aligned, the difference in position of the same environmental point between each of the images (known as disparity or parallax), together with the known geometry of the multiple camera system, can be used to compute the depth to the environmental point using known geometric principles.

The advantage of this three or more sensor system over the two sensor system shown in FIG. 1, is that the addition of data from three or more environmentally displaced sensors imposes additional constraints on the location in the image and produced data stream from the sensors where corresponding points may be found, thus somewhat reducing the processing time required to find the corresponding points to more manageable proportions than that found in the two camera system described above.

The disadvantage of this three or more sensor system over the two sensor system shown in FIG. 1, is that each of the sensors must be accurately aligned and positioned, or if a single sensor is translated along a known direction, its instantaneous position must be continuously known to a high degree of accuracy for useful processing of the produced data stream.

In an article appearing in IEEE Transactions on Pattern Analysis and Machine Intelligence Vol. 14, No. 2, February 1992, pp. 99 to 106, titled "Single Lens Stereo with a Plenoptic Camera", E. H. Adelson and J. Y. A. Wang described a single sensor method for obtaining depth to environmental points in a scene which uses a device which they call a plenoptic camera. The plenoptic camera uses a optical system called a lenticular array consisting of an array of microlenses. Each microlens forms an image of the main lens aperture onto the sensor plane. (See FIG. 6 on page 102 of this article).

The system proposed here uses a multi-image lens instead of a lenticular array as proposed in the article. Multi-image lenses are commercially available with a wide range in the number of facets they possess. In the present system, multiple images are formed through the multi-image lens onto whatever optics the original sensor uses.

OBJECTS AND SUMMARY OF THE INVENTION

Accordingly, it is an object of the present invention to provide a multi-image, single sensor depth recovery system for determining the depth of an object in a scene.

It is still another object of the present invention to provide a multi-image, single sensor depth recovery system for providing a measurement of the depth to points of interest in a scene from multiple sensor images of the scene to enable rapid response planning for autonomous vehicle navigation or provide a warning alert of nearby obstacles to a vehicle operator.

It is still another object of the present invention to provide a multi-image, single sensor depth recovery system for determining the depth of an object in a scene that is easy to manufacture, requires little maintenance for alignment of its sensor and is both economical and easy to use.

Among the advantages of the invention are the following:

1) Since the present invention employs a single sensor, extremely difficult computational problems resulting from misalignment of multi-camera stereo systems are avoided, resulting in greater reliability and faster response times due to lessening the computational manipulation required of the data stream. In addition, previous single sensor methods for depth recovery from visual imagery have required very precise sensor positioning at known locations and times to compute depth. The present invention requires neither multiple sensors nor precise sensor positioning. The embodiment of the invention described below incorporates a multi-image lens that projects multiple images of the area of interest onto the imaging array (typically a light sensitive CCD array) to a predetermined position on the sensor array. The distance between the centers of projection of the multi-image lens provides the necessary image separation or baseline to compute accurate depth to nearby points of interest.

2) Since the present invention uses only a single sensor, the amount of data that must be processed to derive depth is limited to one image, thus making real-time depth extraction possible.

3) Since the present invention uses only a single sensor, the cost of hardware necessary to extract depth from a scene is minimized.

4) Since the system preferably uses passive depth recovery and does not actively emit radiation, it is safe and undetectable over active depth recovery systems.

Two primary applications of the present invention are manned/unmanned ground vehicles and security/surveillance. The value added to these systems is the ability to accurately compute depth to areas of interest, enabling avoidance of obstacles and more accurate recognition of objects. Depending on the multi-image stereo algorithm implementation used, the invention also has the potential for low cost, low power hardware implementations.

The present invention provides a means to obtain the depth to environmental points of interest with the use of a single imaging sensor and a multi-image lens producing a data stream useful as input to known depth analysis algorithms using geometric multi-image stereo analysis.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

Figure 1:
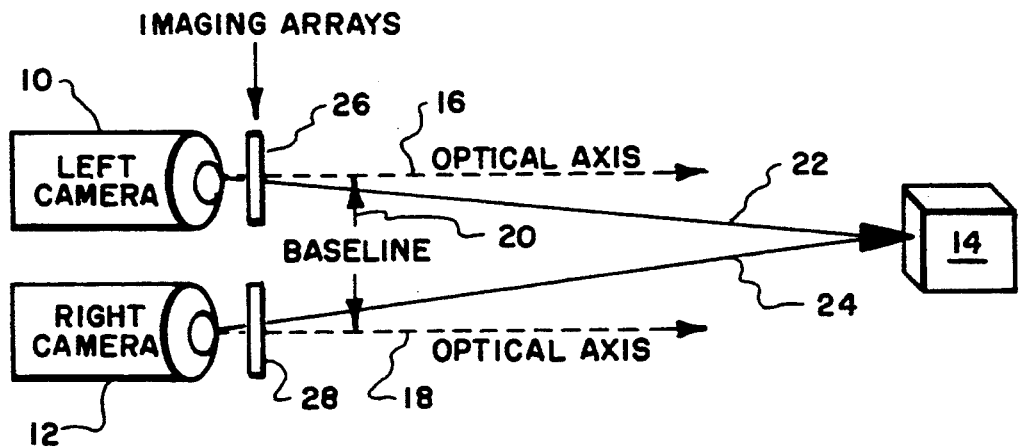
FIG. 1 is a simplified traditional two camera stereo depth analysis system (pin hole model)
Figure 2:
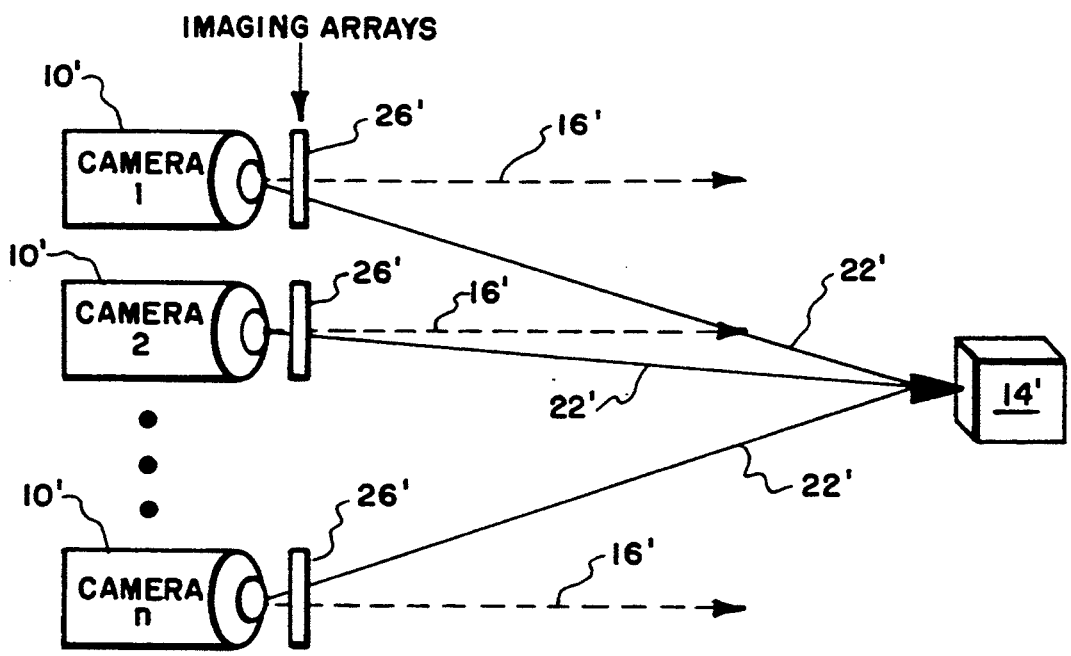
FIG. 2 is a traditional multiple camera stereo depth analysis system.
Figure 3:
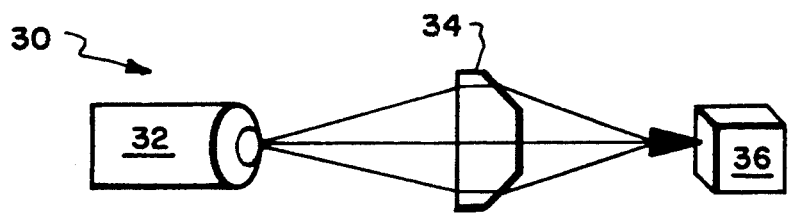
FIG. 3 is a schematic showing a structure embodying the present invention.

FIG. 3 illustrates a preferred embodiment of the present invention as a multi-image single sensor depth recovery system, generally referred to by reference numeral 30. The sensing portion of system 30 comprises a single passive sensing device 32 for imaging radiation from an object at a sensor plane such as a CCD camera, an IR detector, or any other type of radiation detector operating in either the visible or non-visible spectrum.

The present invention may also be embodied in a structure as described herein employing an active sensing device with structural modifications being made to allow for the active components necessary to produce the radiation that is later detected by the sensing device.

Figure 4:
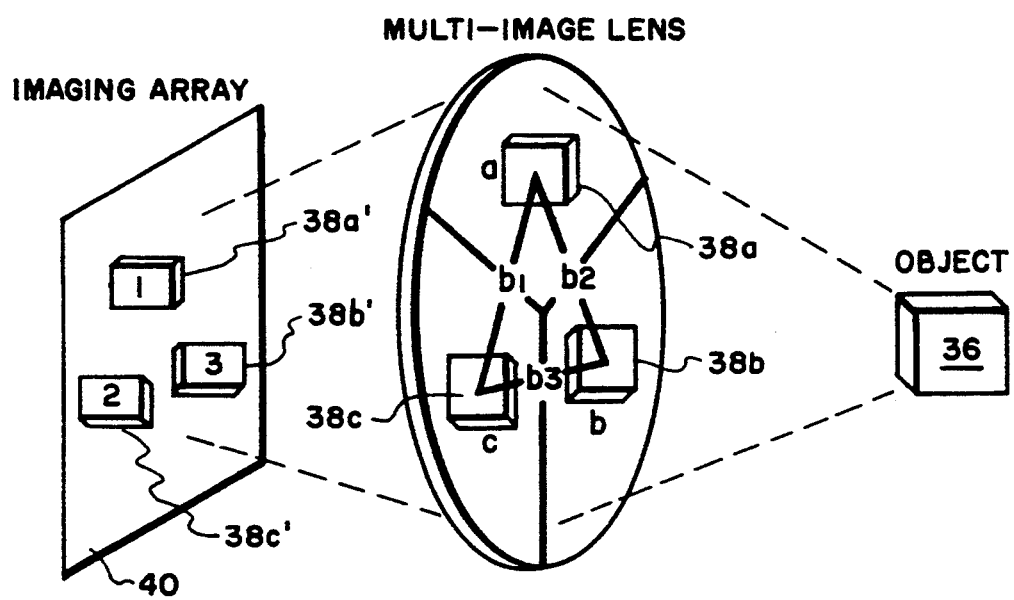
FIG. 4 is a schematic showing the present invention as embodied in a three image depth sensing system; and, FIGS. 5A, 5B and 5C are different multi-faceted lenses capable of providing multiple images that can be utilized in a structure embodying the present invention.

A single lens device 34 having a multiplicity of facets for directing radiation from the object of interest 36 to the sensor plane of sensing device 32 is positioned intermediate the sensor 32 and the object of interest. Lens device 34 is preferably a single integral lens that has multiple facets on its surface nearest the object of interest so that multiple images are produced at the sensor plane 40 of sensor device 32 as illustrated in FIG. 4.

By using a single integral lens, a high overall efficiency and reliability are achieved while providing the simplest structure for low maintenance and cost of manufacturing. Higher efficiency is achieved by a single integral lens over systems using multiple lenses or fiber optic lightguide bundles due to the fact that less radiation loss occurs through a single integral lens than would occur through composite or multiple lenses, or through a fiber optic lightguide bundle having joined separate components, due to such structurally induced differences as multi-path interference and cross-element leakage inherent in such complex separate lensing structures.

Lens device 34 is selected using known geometrical optical principles to form a multiplicity of images 38a' to 38c' of object 36 on the sensor plane 40. Each of the images 38a' to 38c' corresponds to a facet of lens 34. In FIG. 4, each image 38a' to 38c' corresponds to its respective image 38a to 38c formed by facets a, b and c of lens 34.

In sum, multi-image lens image formation is accomplished through the use of a lens that is cut with several facets that reflect light from the same environmental point to different points on the imaging array. The result is that a series of images of the object viewed from several different environmental points are repeated in several positions on the imaging array corresponding to the view through each facet as illustrated in FIG. 4.

Figure 5:
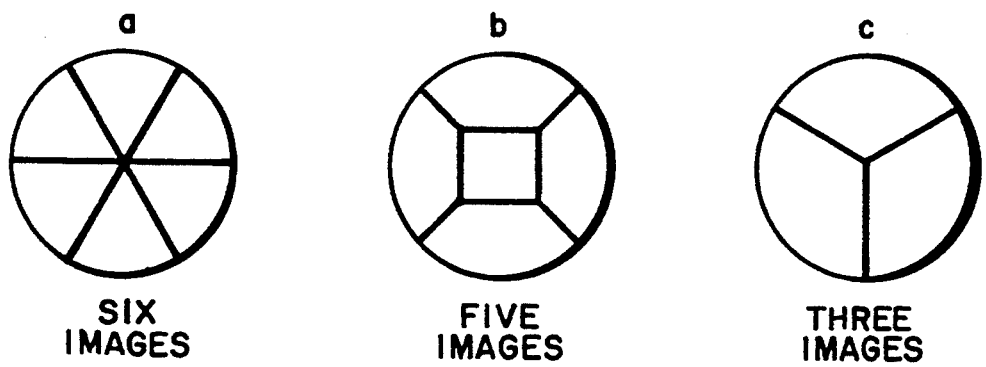

Several configurations of multi-image lenses are available, including, for example, three to six image lenses with different size and shape facets as illustrated in FIG. 5A to 5C.

In some applications it may be preferable to utilize a lens having irregular or different size and shape facets positioned on the same lens in order to selectively locate the images projected by the facets to selected areas on the sensor plane of the sensing device. By using these irregular or different size and shape facets, a single sensor device could be utilized in specialized environmental situations by modifying the mix of the size and shape of the facets of the lens.

One preferred embodiment of a multi-faceted lens would include a lens where both the size and shape of each of the facets is selectively chosen to position each of the images formed on the sensor plane by each of the facets at a maximum baseline distance from each other image formed on the sensor plane.

The effective baseline for a given multi-image lens and sensor is determined by the lens size, as shown in FIG. 4 where b1, b2 and b3 represent the baselines between images. Specifically, b1 is the baseline between images 38a and 38c, b2 is the baseline between images 38a and 38b, and b3 is the baseline between images 38b and 38c.

Calibration of the system involves the determination of the baseline separation between the images from the center of projection for each facet of the lens, which can be accomplished manually prior to use or automatically by computer. Once a lens has been calibrated, the sensor and lens unit need not be recalibrated.

Therefore, the use of a multi-image lens with a single sensing device such as a CCD camera, as proposed in the invention, eliminates the calibration problem discussed above, and requires no sensor movement while providing a compact structural unit.

The compactness of the system, however, requires that only multi-image stereo depth analysis algorithms that can function with very small baselines (distances separating image centers) be used in analyzing the data stream from the sensing device since the baseline using a multi-image lens is on the order of a few millimeters, depending on the lens type and size of the individual CCDs employed in the sensor.

Several methods for computing the disparity from multiple images of the same scene have been proposed. An example of one suitable algorithm uses the sum of squared differences (SSD) calculated in small windows over each of the images, summed over all of the images. The sum of the SSD values will be a minimum for points which accurately correspond in all images. Details for a suitable algorithm may be found in the article by Kanade, Okutomi and Nakahara which appears at pages 409 to 426 of the written Proceedings of the Image Understanding Workshop sponsored by DARPA in January 1992 at San Diego, Calif.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A multi-image single sensor depth recovery system, comprising:

a sensing device for imaging radiation from an object in a scene at a sensor plane and for producing a data stream suitable for processing using multi-image stereo analysis for depth recovery;

a single multi-faceted lens having a multiplicity of refractive facets for directing radiation directly from said object to said sensor plane of said sensing device and for forming a multiplicity of images of said object thereon, each of said images corresponding to a refractive facet of said lens, said lens being calibrated so that the baseline separation between the images from the center of projection for each facet of said lens is predetermined, and multi-image stereo depth analysis means for analyzing the data stream from said sensing device and determining the depth of said object.

2. A multi-image single sensor depth recovery system as in claim 1 wherein said sensing means is a CCD camera.

3. A multi-image single sensor depth recovery system as in claim 1 wherein said sensing means is an Infra-Red detector.

4. A multi-image single sensor depth recovery system as in claim 1 wherein said multiple facets of said single lens are located on the surface of said lens nearest said object.

5. A multi-image single sensor depth recovery system as in claim 1 wherein said multiple facets of said single lens are regular in size.

6. A multi-image single sensor depth recovery system, comprising: claim 1 wherein said multiple facets of said single lens are regular in shape.

7. A multi-image single sensor depth recovery system as in claim 1 wherein said multiple facets of said single lens are irregular in shape.

8. A multi-image single sensor depth recovery system as in claim 1 wherein said multiple facets of said single lens are irregular in size.

9. A multi-image, single passive sensor depth recovery system, comprising:

a passive imaging sensor which images radiation from an object at a sensor plane and produces a data stream suitable for processing using multi-image stereo analysis for depth recovery;

a lens having a multiplicity of refractive facets, said facets directing radiation directly from said object to said sensor plane to form a corresponding multiplicity of images of said object thereon, said lens being calibrated so that the baseline separation between the images from the center of projection for each facet of said lens is predetermined, and multi-image stereo depth analysis means for analyzing the data stream from said sensing device and determining the depth of said object.

10. A multi-image single sensor depth recovery system as in claim 9 wherein said sensing means is a CCD camera.

11. A multi-image single sensor depth recovery system as in claim 9 wherein said sensing means is a Infra-Red detector.

12. A multi-image single sensor depth recovery system as in claim 9 wherein said multiple facets of said single lens are located on the surface of said lens nearest said object.

13. A multi-image single sensor depth recovery system as in claim 9 wherein said multiple facets of said single lens are regular in size.

14. A multi-image single sensor depth recovery system as in claim 9 wherein said multiple facets of said single lens are regular in shape.

15. A multi-image single sensor depth recovery system as in claim 10 wherein said multiple facets of said single lens are irregular in shape.

16. A multi-image single sensor depth recovery system as in claim 9 wherein said multiple facets of said single lens are irregular in size.

17. A multi-image single passive sensor depth recovery system, comprising:

a passive imaging sensor which images radiation from an object at a sensor plane and produces a data stream suitable for processing using multi-image stereo analysis for depth recovery;

a lens having a multiplicity of facets located on the surface of said lens nearest said object, said facets directing radiation from said object to said sensor plane to form a corresponding multiplicity of images of said object thereon, each of said images corresponding to a facet of said lens, both the size and shape of each of said facets being selectively chosen to position each said image formed on said sensor plane by each of said facets at a predetermined desired location on said sensor plane, said lens being calibrated so that the baseline separation between the images from the center of projection for each facet of said lens is predetermined, and multi-image stereo depth analysis means for analyzing the data stream from said sensor and determining the depth of said object.

18. A multi-image single sensor depth recovery system as in claim 17 wherein both the size and shape of each of said facets is selectively chosen to position each said image formed on said sensor plane by each of said facets at a maximum baseline distance from each other image formed on said sensor plane.

* * * * *